(12) United States Patent
Wozna

(10) Patent No.: US 9,446,886 B2
(45) Date of Patent: Sep. 20, 2016

(54) DIFFERENTIAL PRESSURE METERING DEVICE

(71) Applicant: Flexidose, Montigny sur Loing (FR)

(72) Inventor: Patrick Wozna, Montigny sur Loing (FR)

(73) Assignee: Flexidose, Montigny sur Loing (FR)

( * ) Notice: Subject to any disclaimer, the term of this patent is extended or adjusted under 35 U.S.C. 154(b) by 0 days.

(21) Appl. No.: 14/189,605

(22) Filed: Feb. 25, 2014

(65) Prior Publication Data

US 2014/0183230 A1 Jul. 3, 2014

Related U.S. Application Data

(62) Division of application No. 13/127,972, filed as application No. PCT/FR2009/001277 on Nov. 4, 2009, now Pat. No. 8,997,788.

(30) Foreign Application Priority Data

Nov. 5, 2008 (FR) ...................................... 08 06164

(51) Int. Cl.
*F16K 15/14* (2006.01)
*B65D 47/04* (2006.01)
(Continued)

(52) U.S. Cl.
CPC ............... *B65D 47/04* (2013.01); *G01F 11/04* (2013.01); *G01F 11/286* (2013.01); *B05B 11/025* (2013.01); *B05B 11/047* (2013.01); *F16K 24/042* (2013.01); *Y10T 137/7879* (2015.04); *Y10T 137/7888* (2015.04); *Y10T 137/8326* (2015.04)

(58) Field of Classification Search
CPC ..... B65D 47/04; G01F 11/286; G01F 11/04; F16K 24/042; F16K 24/046
USPC .................................. 137/843, 409; 222/207
See application file for complete search history.

(56) References Cited

U.S. PATENT DOCUMENTS 2,970,722 A * 2/1961 Levenson ....................... 222/62
3,567,079 A 3/1971 Weigand
(Continued)

FOREIGN PATENT DOCUMENTS

DE 43 05 390 C1 1/1994
DE 19700607 A1 5/1998
(Continued)

OTHER PUBLICATIONS

Japanese Office Action (with English translation) for Patent Application No. 2013-253642 dated Nov. 25, 2014, 9 pages.
(Continued)

*Primary Examiner* — Kevin Lee
*Assistant Examiner* — P. Macade Nichols
(74) *Attorney, Agent, or Firm* — Patterson Thuente Pedersen, P.A.

(57) ABSTRACT

A metering end cap provided to the neck of a flexible container containing a fluid and intended to transfer, at will, an amount of fluid from an upstream space towards a downstream space, this end cap including a chamber in which is disposed a movable valve normally biased towards a rest position and operationally moved towards an end position. The valve isolates the upstream space and the downstream space from each other in its end position and only in this position, and the outlet of the chamber communicates with the upstream space for any position of the valve other that its end position.

13 Claims, 5 Drawing Sheets

(51) Int. Cl.
*G01F 11/04* (2006.01)
*G01F 11/28* (2006.01)
*B05B 11/02* (2006.01)
*B05B 11/04* (2006.01)
*F16K 24/04* (2006.01)

(56) References Cited

U.S. PATENT DOCUMENTS

| | | | |
|---|---|---|---|
| 3,910,467 | A | 10/1975 | Nilson |
| 4,049,162 | A | 9/1977 | Yule |
| 4,215,724 | A | 8/1980 | Logsdon |
| 4,249,675 | A | 2/1981 | Nilson |
| 4,582,230 | A | 4/1986 | Vierkötter |
| 5,046,526 | A | 9/1991 | Longmore et al. |
| 5,078,305 | A | 1/1992 | Glynn et al. |
| 5,551,599 | A | 9/1996 | Niss |
| 6,068,165 | A | 5/2000 | Minihane et al. |
| 6,343,716 | B1 | 2/2002 | Baudin et al. |
| 6,662,973 | B1 | 12/2003 | Velliquette |
| 6,997,358 | B2 | 2/2006 | Wass |
| 7,494,028 | B2 | 2/2009 | Litterst et al. |
| 7,726,520 | B2 | 6/2010 | Harrold |
| 8,069,875 | B2 | 12/2011 | Mashiko |
| 8,136,701 | B2 | 3/2012 | Veltrop et al. |
| 8,434,647 | B2 | 5/2013 | Aamar |
| 8,464,904 | B2 | 6/2013 | Woodruff |
| 2010/0181343 | A1 | 7/2010 | Crossdale et al. |
| 2011/0056981 | A1* | 3/2011 | Xiao et al. .................. 222/67 |
| 2011/0089191 | A1 | 4/2011 | Altonen et al. |
| 2011/0277857 | A1 | 11/2011 | Wozna |
| 2011/0290828 | A1 | 12/2011 | Lolk |
| 2013/0037575 | A1 | 2/2013 | van der Molen |

FOREIGN PATENT DOCUMENTS

| | | |
|---|---|---|
| EP | 0 995 976 A1 | 4/2000 |
| FR | 2 210 556 | 7/1974 |
| JP | 50-41946 | 4/1975 |
| JP | 52-74164 | 6/1977 |
| JP | U3068076 | 2/2000 |
| JP | 2005-138900 | 6/2005 |
| JP | 2007069931 A | 3/2007 |
| WO | WO 99/06802 | 2/1999 |
| WO | WO 00/37179 | 6/2000 |
| WO | WO 2012/016911 A1 | 2/2012 |
| WO | WO 2012/062576 A1 | 5/2012 |
| WO | WO 2012/171708 A1 | 12/2012 |

OTHER PUBLICATIONS

European Search Report for European Application No. 14 15 7367.5 dated May 27, 2014.

FR Search Report dated Jul. 21, 2009 for FR Application No. 0806164 filed Nov. 5, 2008, 2 pages.

Application and File history for U.S. Appl. No. 13/127,972, filed Jul. 27, 2011. Inventor: Patrick Wozna.

* cited by examiner

//<br>
DIFFERENTIAL PRESSURE METERING DEVICE

RELATED APPLICATIONS

This application is a division of application Ser. No. 13/127,972 filed Jul. 27, 2011, which is a National Phase entry of PCT Application No. PCT/FR2009/001277, filed Nov. 4, 2009, which claims priority from French Application No. 0806164, filed Nov. 5, 2008, each of which is hereby fully incorporated herein by reference.

TECHNICAL FIELD

Embodiments of the present invention relate to the production of devices for metering liquid or pasty fluids, such as, in particular, cosmetic, food or cleaning fluids, such fluids being generally contained in a flexible flask and being delivered in calibrated measured amounts each time a user presses this flask.

More precisely, embodiments of the invention relate to a metering device for transferring, from an upstream space towards a downstream space, a predetermined volume of liquid or pasty fluid in response to a rise in pressure of this fluid in the upstream space, this device including at least a hollow body and a valve, the hollow body delimiting at least partially a chamber equipped with an inlet and an outlet, the valve being movable with respect to the hollow body between a rest position, towards which this valve is biased by a return force, and an end position, which is spaced from the rest position and towards which this valve is selectively biased by the fluid flowing from the upstream space towards the downstream space, the upstream space extending at least outside the chamber at the inlet side thereof, and the downstream space extending at least outside the device and the chamber at the outlet side thereof.

BACKGROUND OF THE INVENTION

Such a device is for example known from patent document EP 0,995,976 entitled "Metering end cap and container equipped with a metering end cap according to the invention". The device described in this document has a large number of molded or blown parts, the manufacturing and assembly tolerances of which are very low. Moreover, the design of this device requires guiding the valve, called "metering piston", both on its internal diameter and on its external diameter, which causes the generation of high friction forces.

U.S. Pat. No. 4,582,230, entitled "Metering Device", also describes a fluid metering device, this metering device implementing a lock of which volume corresponds to the unitary metered amount. The outlet aperture of the metering device is selectively shut-off by a piston connected by a cylindrical rod to a ball controlling the opening of the lock, on the upstream space side delimited by a bottle. When the bottle is held in a vertical position, the piston closes the pourer of the metering device. When the bottle is being overturned, the piston keeps on maintaining the pourer closed, while the liquid enters in the lock. Once the bottle is in the vertical position, the ball closes the inlet of the lock, whereas the piston is descended, opening the pourer and releasing the liquid contained in the lock.

In addition to the fact that this solution also requires implementing a large number of parts, the result sought can only be obtained by slowly reversing the bottle, so that the tank fills in before the ball comes to close the liquid inlet in the tank, and before the piston releases the liquid contained in the tank. In addition, such a device is not adapted to the metering of viscous fluids.

SUMMARY OF THE INVENTION

In this context, an embodiment of the present invention is a metering device free from at least one of the aforementioned defects.

To this end, embodiments of the invention include a valve that isolates the upstream space and the downstream space from each other in its end position and only in this position, and a chamber outlet that communicates with upstream space for any position of the valve other than its end position.

With this arrangement, the fluid traversing the hollow body under the effect of a pressure increase at the chamber inlet causes the valve to move from its rest position to its end position, and the volume of fluid delivered from when the valve leaves its rest position and when this valve reaches its end position is equal to the volume of fluid whose flow is necessary to operate this displacement of the valve.

In a possible embodiment, the valve includes at least a diaphragm movable in translation with respect to the hollow body, and the return force at least partially includes an elastic return force.

In this case, embodiments of the invention include at least an elastic tab attaching the valve to the hollow body, that the hollow body, the valve, and each elastic tab be integrally made from an elastic material, and that the return force be exerted by each elastic tab.

In another possible embodiment, the valve includes at least an articulated shutter, rotationally movable with respect to the hollow body, the return force at least partially comprising an elastic return force.

Embodiments of the invention can also include a sealing seat which surrounds a fluid passage disposed between the upstream space and the downstream space, and on which the valve rests in its end position.

The manufacturing of an embodiment of the invention can be facilitated by providing the embodiment of the invention with a plug inserted in the hollow body, this plug having bored therein a flow-through opening forming the chamber outlet.

In a more advanced embodiment of the invention, it is possible to provide the metering device such that it further includes a piston and a spring, that the piston be slidingly assembled in the hollow body and bears said valve, and that the spring be preloaded in compression and disposed between the plug and the piston.

If the viscosity of the fluid to be delivered is relatively low, it can be judicious to provide the chamber outlet such that it is bored in an elastically deformable wall and that it has a flow cross-section reversibly increasing under the effect of the fluid pressure.

In other possible embodiments of the invention, the density of the valve is lower than one so the valve can float in the fluid, the return force biasing this valve towards its rest position thus being at least partially composed of a buoyancy exerted on this valve which, in operation, soaks in the fluid to be delivered.

Embodiments of the invention may constitute a complete operational unit, in which case, it further includes a container provided with a neck, this container intended to contain the fluid and delimiting a variable volume upstream space, the rise in fluid pressure being obtained by reducing the upstream space volume, for example, by deforming the container in the case where it is flexible, and the hollow body being sealingly disposed in this container neck.

Other features and advantages of the invention will become more apparent from the following description thereof, given only for illustrative and in no way restrictive purposes, with reference to several embodiments illustrated in the accompanying drawings, in which:

BRIEF DESCRIPTION OF THE DRAWINGS

FIG. 3b is a top view of a valve which may be used in the particular embodiment constituting an alternative of FIG. 3a;

FIG. 5b is a front view of the outlet of the cruciform chamber illustrated in FIG. 5a;

FIG. 6b is an elevation side view of the embodiment of the invention illustrated in FIG. 6a;

FIG. 10b is a top view of the piston and the valve of the embodiment of the invention illustrated in FIG. 10a, the piston and the valve being represented in the position they occupy in FIG. 10a;

DETAILED DESCRIPTION OF THE DRAWINGS

Figure 1:
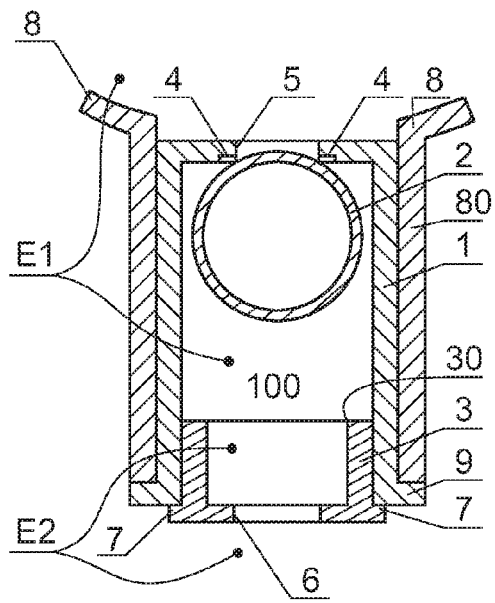
FIG. 1 is an axial cross-sectional view representing an embodiment of the invention in which the valve is formed by a spherical floater.

As previously stated, an embodiment of the invention relates to a metering device for transferring, from an upstream space E1 towards a downstream space E2, a predetermined volume of liquid or pasty fluid in response to a rise of fluid pressure in the upstream space E1.

As shown in particular on FIGS. 1 to 3a, 4, 6a, 7a, 8a, 9b and 10a, an embodiment of the invention includes at least a hollow body 1 and a valve 2.

An embodiment of the invention further includes a container 8 (represented only partially on the figures) for containing a fluid to be dispensed, and provided with a neck 80 which is the unique outlet for the fluid.

The internal volume delimited by this container, which constitutes at least the upstream space E1, has a variable capacity.

To this end, the container may for example include a flexible and elastically deformable wall, so that a pressure exerted on this wall by a user causes a transient reduction of the volume of the upstream space E1 and a concomitant rise in the pressure of the fluid contained in the container.

Alternatively, the container may be only formed with rigid walls, while including a piston which may be actuated by the user to cause a transient reduction of the upstream space E1 volume and a concomitant rise in the pressure of the fluid contained in this container.

The hollow body 1 is sealingly disposed in the neck 80 of this container 8. In particular, the hollow body 1 can be forcibly inserted into neck 80 until a stopper 9 of the hollow body presses against this neck.

The hollow body 1, of which shape is substantially cylindrical, at least partially delimits a chamber 100 provided with an inlet 5 and an outlet 6.

Valve 2 is movable with respect to hollow body 1 between a rest position illustrated, for example, on FIGS. 1, 2, 3a, 4, 6a, 6b, 7a (in dotted lines), 8a, 8th, 9b and 10a, and an end position illustrated, for example, on FIGS. 6c, 7b, 8b, 8c, 9a and 10c, which is spaced apart from the rest position.

Valve 2 is biased towards its rest position by a return force, and biased towards its end position, during application of a differential pressure between the chamber inlet 5 and the chamber outlet 6, the fluid flowing from the upstream space E1 towards the downstream space E2, upstream space E1 extending at least outside chamber 100 at its inlet 5 side, and the downstream space E2 extending at least outside the metering device and from chamber 100 at its outlet 6 side.

In its typical rest position, the container or flask 8 is positioned vertically so that its neck 80 is turned downwards, the fluid to be dispensed thus spontaneously tends to flow by gravity from the upstream space E1 towards downstream space E2, and from the inlet 5 of chamber 100 towards the outlet 6 of this chamber.

According to an embodiment of the invention, valve 2 isolates the upstream space E1 and the downstream space E2 from each other in its end position, and only in this position.

In addition, the outlet 6 of chamber 100 communicates with upstream space E1 for any position of valve 2 other that its end position.

As shown in particular in FIGS. 1, 2, 3a, 4, 5a, 6a, 6c, 7a, 7b, 8a, 8b, 10a and 10c, valve 2 can for example fulfill its function by cooperating with a sealing seat 30 which surrounds a fluid passage disposed between upstream space E1 and downstream space E2, and on which this valve 2 presses in its end position.

Moreover, as shown in FIGS. 1, 2, 3a, 8a to 8f, 9a, 9b, 10a and 10c, an embodiment of the invention may include a plug 3 inserted in the hollow body 1, this plug having drilled therein a flow-through opening forming the outlet 6 of chamber 100.

FIGS. 1 to 5b illustrate embodiments of the invention in which valve 2 has an average density lower than that of the fluid to be dispensed, and typically a density lower than one.

In this case, valve 2, when it soaks in the fluid to be dispensed, behaves like a floater, so that the return force which biases this valve towards its rest position is at least partially composed the buoyancy exerted thereon.

As an extension of this description of the embodiments of FIGS. 1 to 5b, words "upper" and "lower", to indicate relative directions or positions, will be used in their common meaning, i.e. with reference to the application direction of the terrestrial gravity, and thus respectively to a upper/lower altitude with respect to the ground level.

Moreover, the container or flask 8 will be regarded to as being oriented such that its neck 80 is aimed downwards.

In the first detailed embodiment illustrated in FIG. 1, the hollow body 1, for example of a cylindrical shape and made from plastic, contains, as valve 2, a hollow and spherical floater.

This hollow body 1 is forcibly inserted in neck 80 of container 8 containing the fluid to be metered until a stopper 9 of this body 1 comes into contact with this neck.

In addition, plug 3 is forcibly inserted in the lower part of the hollow body 1 until a stopper 7 of this plug 3 comes into contact with this body 1.

The inlet 5 of chamber 100 has the shape of an opening provided in the hollow body 1, and the outlet 6 of chamber 100 has the shape of an opening provided in plug 3.

The size and/or shape of the outlet of the fluid chamber 6 may thus be modified at will by substituting the plug 3 inserted in neck 80 by another plug 3 having a flow-through opening 6 of a different size and/or shape.

Two grooves 4, for example U-shaped and disposed at 90° from each other, are provided in the upper part of the hollow body 1 so as to avoid floater 2 from sealingly shutting-off the inlet opening 5 of chamber 100, which is located in the upper part of the hollow body 1.

The edge of the recessed part of plug 3 forms a sealing seat 30 making it possible for floater 2, when it comes to rest on this seat 30 in its end position under the effect of a fluid pressure rise in upstream space E1, to isolate this upstream space E1 from downstream space E2, and to stop the fluid flow through the calibrated opening 6 of chamber 100 outlet.

The annular gap between the hollow body 1 and floater 2 is sized so as to allow a flow by gravity of the fluid under floater 2. Thus, as soon as the fluid pressure in the upstream space E1 is released, allowing the fluid to flow again under floater 2, this floater is subjected, as its density is lower than that of the fluid, to a buoyancy which sends floater 2 back in contact with the upper part of the hollow body 1, i.e. in its rest position illustrated in FIG. 1.

To generate, within the fluid to be dispensed, the differential pressure necessary to displace floater 2, the flow cross-section of opening 6 of the outlet of chamber 100 should be provided such that it is higher than the flow cross-section provided by the annular gap between the floater 2 and the hollow body 1.

When a pressure is exerted on the flexible container 8 to expel the fluid contained in the upstream space E1, floater 2 is biased by the fluid moving to the bottom of the hollow body 1, while the majority of the fluid contained in chamber 100 between floater 2 and plug 3 traverses the outlet opening 6 of the chamber. Then, floater 2 comes to abut against the plug on the sealing seat 30 which it seals, prohibiting expelling more fluid. The subsequent release of pressure on container 8 and thus in upstream space E1 creates a depression which, by a light rising of the floater, causes air to enter into chamber 100.

The flexible container 8 can thus return to its rest position, and the fluid, which flows by gravity in the hollow body 1, makes floater 2 to ascend at the upper position towards its rest position, under the effect of buoyancy.

Figure 2:
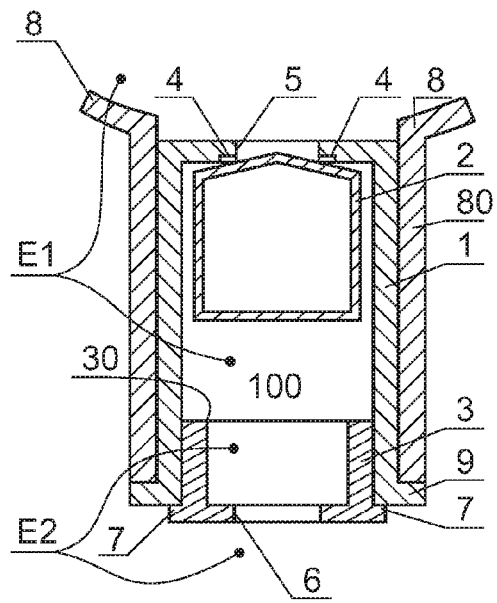
FIG. 2 is an axial cross-sectional view representing an embodiment of the invention in which the valve is formed by a cylindrical floater with a truncated head.

FIG. 2 illustrates an embodiment of the invention which differs from the embodiment of FIG. 1 only by the fact that valve 2 has the shape of a cylindrical floater 2 provided with a truncated upper part instead of having the shape of a spherical floater. Insofar as, for a same encumbrance inside chamber 100, this truncated head cylindrical floater has a higher volume than that of the spherical floater, the embodiment of FIG. 2 is more particularly adapted to the metering of low density fluids.

Figure 3A:
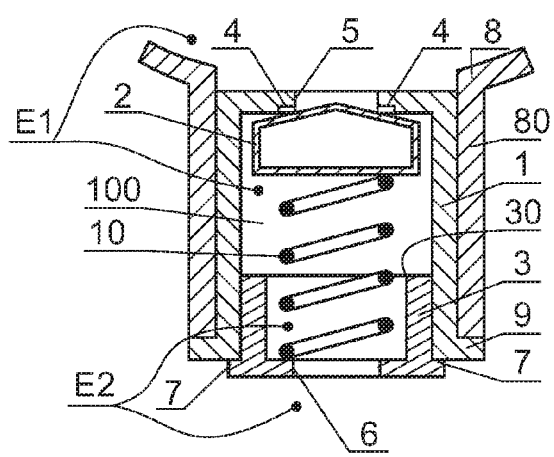
FIG. 3a is an axial cross-sectional view representing an embodiment of the invention in which the valve is formed by a floater biased towards its rest position by a spring.

In another embodiment of the invention, illustrated in FIG. 3a, a helical spring 10 preloaded in compression is disposed between the bottom of plug 3 and floater 2, this floater 2 being thus biased towards its rest position, abutting against the upper wall of the hollow body 1 at the inlet opening 5, by a return force including both the buoyancy exerted on floater 2 by the fluid, and the elastic force exerted on floater 2 by spring 10.

In an embodiment, the elastic force exerted by spring 10 on floater 2 is sized to only compensate the weight of floater 2, spring 10 being only used to support the ascent of floater 2 when the fluid flows at the bottom of hollow body 1. This arrangement, which makes it possible to easily overcome viscous frictions, is more particularly adapted if the viscosity of the fluid to be dispensed is high.

Figure 3B:
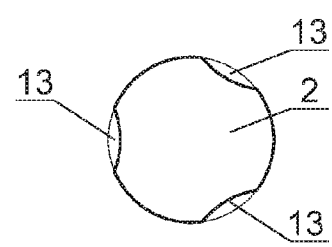

FIG. 3b illustrates an alternative of the embodiment of FIG. 3a, that may be implemented in the case illustrated on FIG. 3a and in which floater 2 has an upper part of truncated shape. According to this alternative embodiment, the upper part of floater 2 comprises several circular notches 13 cut-out on the entire cylindrical height of floater 2, so that the fluid can flow from container 8 towards chamber 100 when floater 2 is in its rest position. Nevertheless, these notches 13 are sized such that floater 2 is still able to seal the sealing seat 30 once it reaches its end position. To this end, the minimum diameter of the cylindrical surface of floater 2, at the deepest locations of notches 13, is higher than the diameter of the interior surface of plug 3. Moreover, as previously, the surface of the annular section defined between floater 2 and the interior of hollow body 1 remains lower than the surface of the outlet opening 6 of chamber 100, provided in plug 3.

Figure 4:
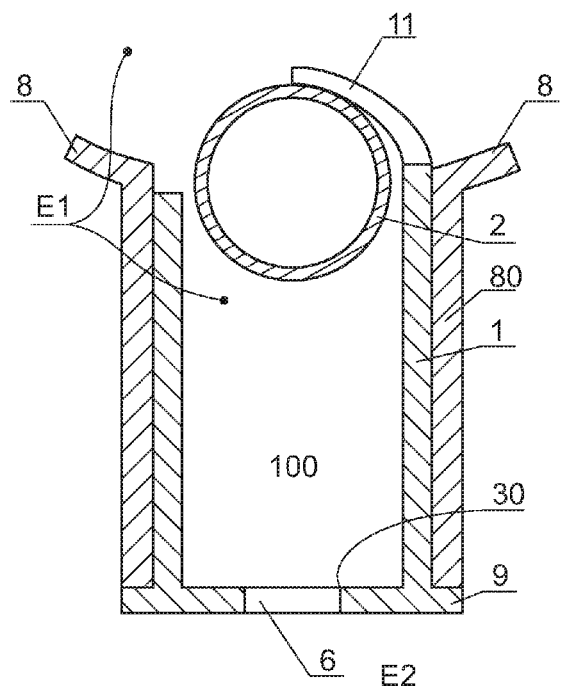
FIG. 4 is an axial cross-sectional view representing an embodiment of the invention in which the valve is formed by a floater maintained in its rest position by a semi-rigid tab.

FIG. 4 represents an embodiment of a metering device without the plug and in which the hollow body 1 is forcibly inserted into neck 80 of the flexible container containing the fluid until a stopper 9 of the hollow body presses on neck 80. Owing to the absence of a plug, the outlet opening 6 of chamber 100 is directly provided in the base of hollow body 1. The sealing seat 30 is then directly formed by the edge of the opening 6, on which valve 2 comes to press sealingly in its end position. The upper part of the cylindrical hollow body 1 is entirely open. A semi-rigid tab 11, for example, formed of a single piece with the upper part of the wall of hollow body 1, covers the upper opening of this body 1 so that floater 2, once inserted under the semi-rigid tab 11, remains trapped in the hollow body 1 despite the action of the differential pressures exerted in the fluid during the use of the flexible container. In other words, the insertion of the floater 2 under the semi-rigid tab 11, or the withdrawal of this floater, can only be obtained by applying to tab 11 a deformation higher than that it undergoes in normal use of the metering device of embodiments of the invention.

When container 8 is in the rest position, with the neck 80 oriented downwards, the fluid contained in this container 8 flows by gravity until it fills chamber 100 delimited by the hollow body 1, so that the floater is brought back to its rest position, by the effect of buoyancy, abutting against tab 11.

A pressure exerted on container 8 causes the fluid contained therein to flow towards neck 80. The moving fluid exerts a pressure on the floater 2, which moves downwards while expelling, through the outlet opening 6, the fluid contained in chamber 100. Once floater 2 is resting against seat 30 surrounding the outlet opening 6, this opening is sealed and the flow of fluid out of chamber 100 and towards downstream space E2 is stopped. The relief of the pressure on the surface of container 8 produces a depression which causes air to enter inside hollow body 1, bringing back the container to its rest state. Owing to the annular gap between floater 2 and the interior wall of the cylindrical hollow body 1, the fluid flows again in chamber 100 by gravity and passes under floater 2, so that the buoyancy exerted on this floater 2 gradually brings it back to its rest position, in abutment against the semi-rigid tab 11.

In an embodiment, the semi-rigid material constituting tab 11 is selected flexible enough to be able to undergo the necessary deformation to forcibly insert floater 2 in hollow body 1 without breaking, but sufficiently rigid so as not to undergo, under the effect of the buoyancy exerted on floater 2, a deformation which would cause the floater to escape from the hollow body when in its rest position in which it is pressed on this tab. The embodiment of FIG. 4 makes it possible to produce the metering device in two molded parts, namely the main body 1 and tab 11 on one hand, and floater 2 on the other hand.

Figure 5A:
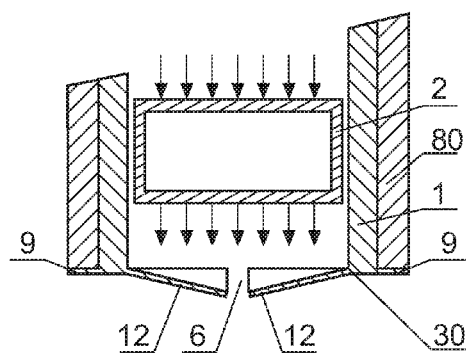
FIG. 5a is an axial cross-sectional view representing an embodiment of the invention in which the chamber outlet is formed by a cruciform flow-through opening.
Figure 5B:
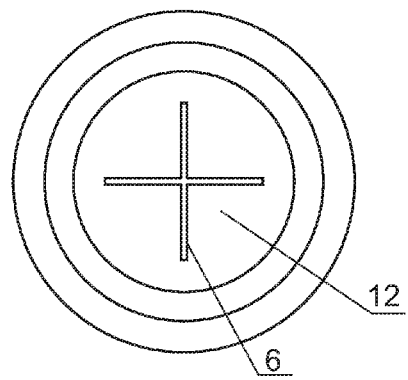

FIGS. 5a and 5b illustrate an alternative embodiment particularly applicable to the embodiment of FIG. 4 and particularly adapted to the case where the fluid to be metered has a relatively low viscosity.

According to this alternative embodiment, the outlet of chamber 6 is bored in an elastically deformable wall and has a flow cross-sectional area reversibly increasing under the effect of the fluid pressure.

In this regard, the bottom 12 of hollow body, where the flow-through opening 6 forming the outlet of chamber 100 is provided, is made from an elastically deformable material exhibiting a cruciform cut-out, and valve 2 exhibits a cylindrical shape.

When the pressure exerted on the flexible container 8 causes floater 2 to descend towards its end lower position to abut on seat 30, the thrust exerted by the fluid moving at the same time than floater 2 exerts on bottom 12 a pressure which deforms each part of the cruciform cut-out, so that the surface of outlet 6 of chamber 100 reversibly increases as an increasing function of this pressure.

Once abutting on the lower part in its end position, floater 2 seals outlet 6 and prevents any flow of fluid. Without external pressure, the only force generated by the height of fluid in the container cannot overcome the elasticity of the flexible blades formed at the corners of the cruciform outlet 6 of chamber 100, the fluid being thus retained in the metering device.

FIGS. 6a to 10d illustrate other possible embodiments of the invention, in which the density of valve 2 is not specified a priori and in any case not necessarily lower than that of the fluid, this valve being biased towards its rest position by a return force of an exclusively elastic nature.

In the embodiment depicted in FIGS. 6a to 6d, valve 2 is formed by a diaphragm movable in translation with respect to hollow body 1, this diaphragm being connected to hollow body 1 by two elastic tabs 21 diametrically opposite to each other, and the elastic return force of the valve being exerted by these tabs 21.

In this embodiment, the hollow body 1, the valve 2 and each elastic tab 21 are preferably integrally formed from an elastic material.

The sealing seat 30, on which valve 2 rests in its end position, is formed on the upper part of the hollow body 1 and surrounds a fluid passage disposed between upstream space E1 and downstream space E2 and forming the inlet 5 of chamber 100.

Figure 6A:
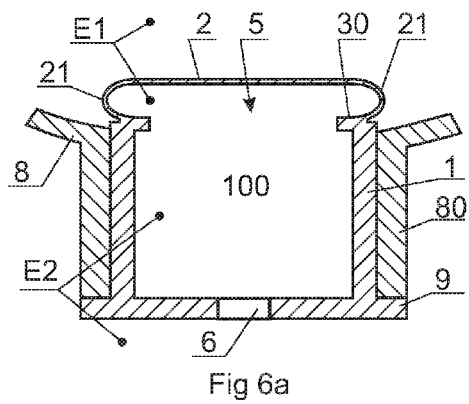
FIG. 6a is an axial cross-sectional view representing an embodiment of the invention in which the valve is formed by a diaphragm illustrated in its rest position.
Figure 6B:
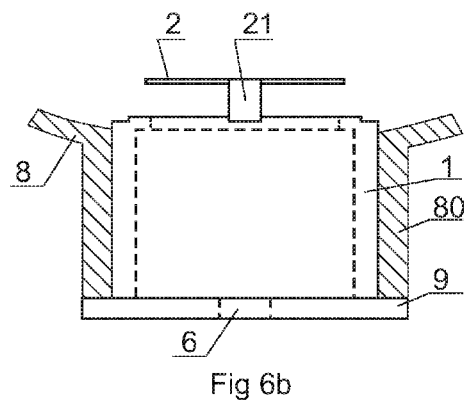

At rest, valve 2 occupies the position illustrated in FIGS. 6a and 6b.

Figure 6C:
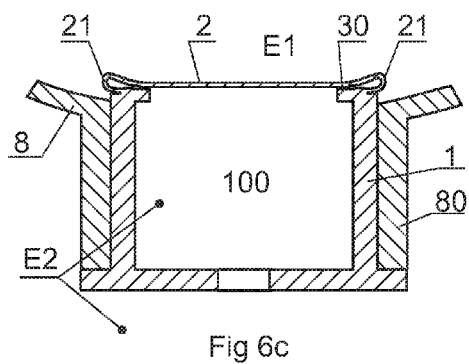
FIG. 6c is another axial cross-sectional view of the embodiment of the invention illustrated in FIG. 6a, in which the valve is represented in its end position.
Figure 6D:
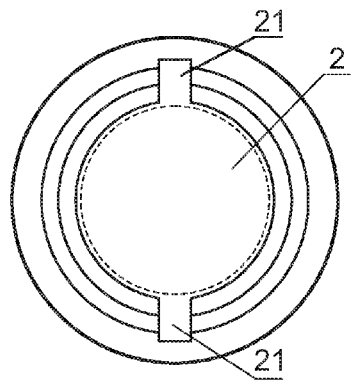
FIG. 6d is an elevation top view of the embodiment of the invention illustrated in FIG. 6b.

When the fluid in the upstream space E1 is subjected to a pressure which pushes it towards outlet 6, the kinetic energy imparted to the fluid exerts on valve 2 a trailing force which biases it towards its end position illustrated in FIG. 6c, the amplitude Fx of this trailing force satisfying equation:

$$Fx = \rho \cdot S \cdot V^2 \cdot Cx/2,$$

Where ρ represents the fluid density;
where S represents the master-torque of valve 2;
where V is the fluid speed; and
where Cx represent the trailing coefficient, related to the shape of the valve.

As in the preceding embodiments, the fluid which traverses the hollow body 1 under the effect of a pressure increase at the inlet 5 of chamber 100 moves valve 2 from its rest position (FIG. 6a) to its end position (FIG. 6c), and the volume of fluid dispensed from when valve 2 leaves its rest position till when this valve 2 reaches its end position is equal to the volume of fluid whose flow is necessary to provide this displacement of valve 2.

Figure 7A:
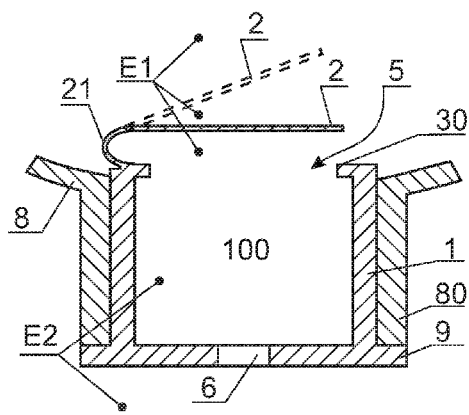
FIG. 7a is an axial cross-sectional view representing an embodiment of the invention in which the valve is formed by a single shutter illustrated in dotted lines in its rest position and in solid lines in an intermediate position.
Figure 7B:
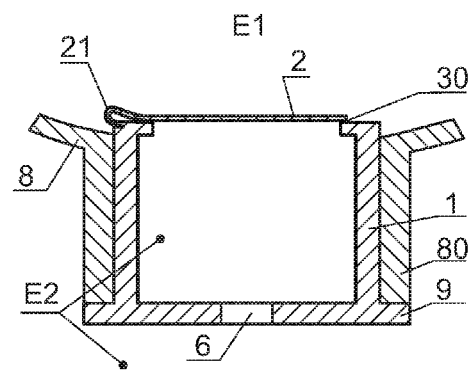
FIG. 7b is an axial cross-sectional view of the embodiment of the invention illustrated in FIG. 7a, in which the valve is represented in its end position.

The embodiment depicted in FIGS. 7a and 7b differs from the embodiment depicted in FIGS. 6a to 6d only by the fact that valve 2 is attached to the hollow body 1 by a single elastic tab 21, this valve being represented in its rest position in dotted lines on FIG. 7a and in its end position on FIG. 7b.

The embodiment depicted in FIGS. 8a to 8f uses the same valve 2 than the embodiment depicted in FIGS. 6a to 6d, as well as a plug 3 inserted into hollow body 1 and carrying the outlet opening 6, as is particularly the case in the embodiments depicted in FIGS. 1, 2 and 3a.

On the other hand, the embodiment depicted in FIGS. 8a to 8f further includes a piston 14 and a spring 15.

The piston 14 is slidingly mounted in hollow body 1 and valve 2 is carried by the piston 14 by means of two elastic tabs 21 in the same way than it was carried by hollow body 1 in the embodiment depicted in FIGS. 6a to 6d.

Piston 14 has a substantially annular form (FIG. 8f) defining a sealing seat 30 around a fluid passage constituting the inlet 5 of chamber 100 and which allows a selective communication between upstream space E1 and downstream space E2.

Spring 15 is preloaded in compression and disposed between plug 3 and piston 14, so that it tends to give to chamber 100 a maximum volume.

A stopper 140 is formed on the internal periphery of hollow body 1 to limit the travel of piston 14 upwards by defining a maximum upper position of this piston within hollow body 1.

The operation of the metering device according to an embodiment is illustrated in a sequential and chronological way in FIGS. 8a to 8e.

Figure 8A:
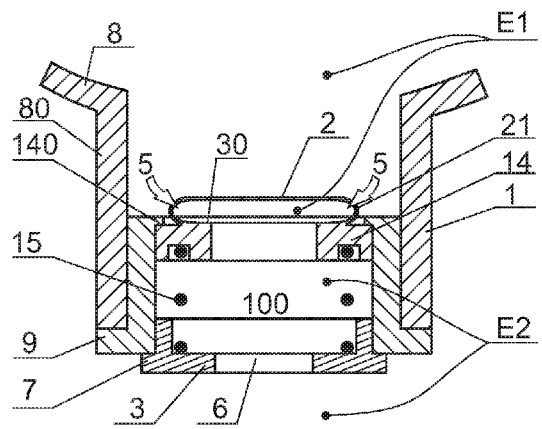
FIG. 8a is an axial cross-sectional view representing an embodiment of the invention in which the valve is formed by a diaphragm illustrated in its rest position, and in which the chamber is closed by the diaphragm associated with a piston and has a variable volume, this chamber being represented with its maximum volume.
Figure 8D:
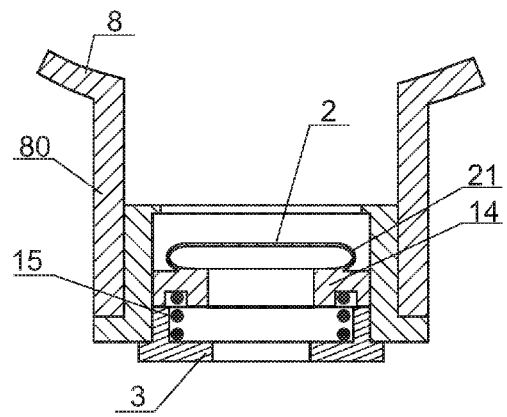
FIG. 8d is an axial cross-sectional view of the embodiment of the invention illustrated in FIGS. 8a to 8c and seen in a transient state prior to that which is illustrated in FIG. 8c, the valve being again represented in its rest position, whereas the chamber is still represented with its minimal volume.

FIG. 8a illustrates an embodiment of the invention in its stable rest configuration, in which outlet 6 of chamber 100 communicates with inlet 5 of this same chamber.

Figure 8B:
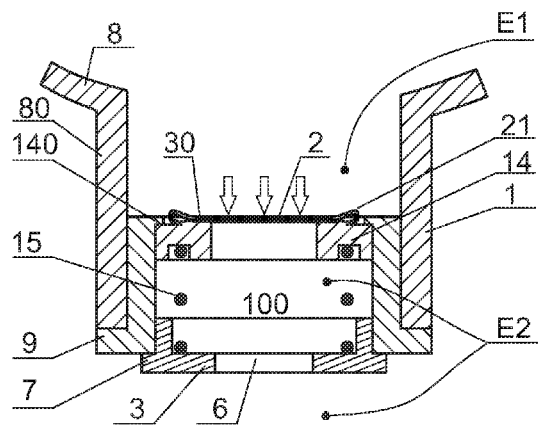
FIG. 8b is an axial cross-sectional view of the embodiment of the invention illustrated in FIG. 8a and seen in a transient state prior to that which is illustrated in FIG. 8a, the valve being represented in its end position and the chamber being still represented with its maximum volume.

The pressure rise in container 8 causes the displacement of valve 2 towards its end position illustrated in FIG. 8b, and in which this valve seals inlet 5 of chamber 100 while applying on the valve seat 30.

Figure 8E:
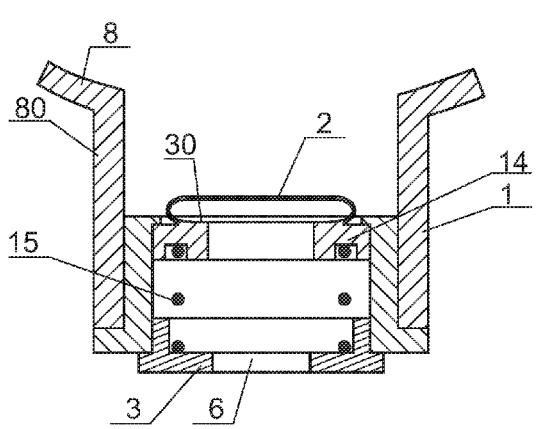
FIG. 8e is an axial cross-sectional view of the embodiment of the invention illustrated in FIGS. 8a to 8d and seen in a stable state posterior to that which is illustrated in FIG. 8d and identical to the initial state illustrated in FIG. 8a, the valve being returned back to its rest position, and the chamber having resumed its maximum volume.
Figure 8C:
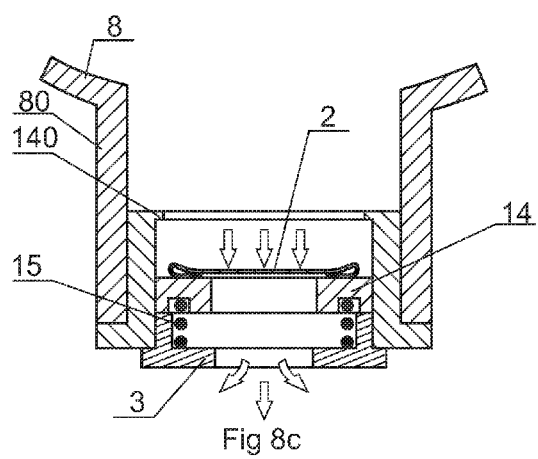
FIG. 8c is an axial cross-sectional view of the embodiment of the invention illustrated in FIGS. 8a and 8b and seen in a transient state prior to that which is illustrated in FIG. 8b, the valve being still represented in its end position, and the chamber being represented with its minimal volume.
Figure 8F:
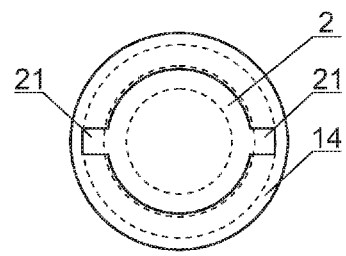
FIG. 8f is a top view of the embodiment of the invention illustrated in FIG. 8e.

Insofar as the pressure of the fluid is thus exerted on the entire surface of the piston 14 closed by valve 2, this piston moves downwards while reducing the volume of chamber 100, causing the discharge, through outlet 6, of the fluid contained in this chamber, and compressing spring 15 correlatively, this movement being stopped when the piston 14 comes to rest against plug 3 (FIG. 8c).

Following the relief of the fluid pressure in container 8, the elastic return force exerted by tabs 21 brings valve 2 back to its rest position (FIG. 8d), thus allowing the fluid contained in container 8 to flow in chamber 100 by gravity.

As spring 15 biases piston 14 upwards, as well as to the fluid which flows in chamber 100, chamber 100 resumes its initial maximum volume (FIG. 8e), and the metering device thus returns back to its initial stable rest configuration.

Thus, the embodiment of FIGS. 8a to 8f makes it possible to dispense a volume of fluid including, in addition to the volume of fluid dispensed while the valve moves from its rest position to its end position, a volume of additional fluid exactly equal to the difference between the maximum volume of chamber 100, illustrated in FIGS. 8a and 8e, and the minimal volume of this chamber, illustrated in FIG. 8c.

FIGS. 9a to 9d on one hand, and FIGS. 10a to 10d on the other hand, respectively illustrate two embodiments making also use of the principle of a chamber 100 closed by a piston 14 biased by a spring 15.

Moreover, in these two cases, the chamber is partially delimited by a plug 3 inserted in the hollow body 1, and the latter including an internal peripheral stopper 140 making it possible to limit the ascending travel of the piston 14.

Figure 9A:
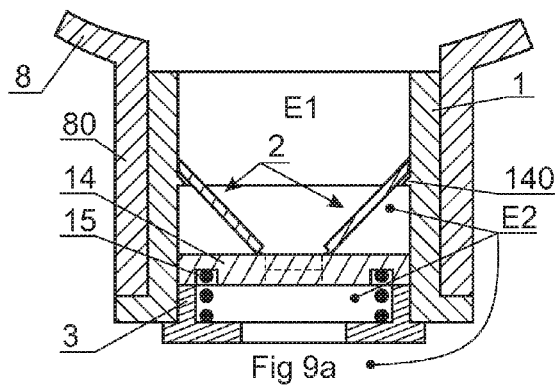
FIG. 9a is an axial cross-sectional view representing an embodiment of the invention in which the valve is formed by a double shutter illustrated in its end position, and in which the chamber is closed by this double shutter associated with a piston, this chamber having a variable volume and being represented with its minimal volume.
Figure 9C:
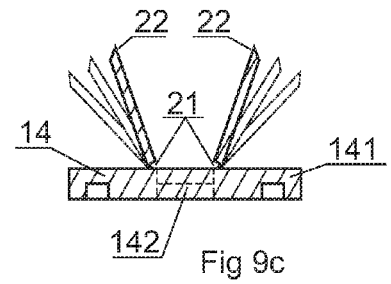
FIG. 9c is a side view of the piston and valve of the embodiment of the invention illustrated in FIGS. 9a and 9b, the valve being represented in solid lines in its rest position, and, in dotted lines, in an intermediate position and in its end position.
Figure 9B:
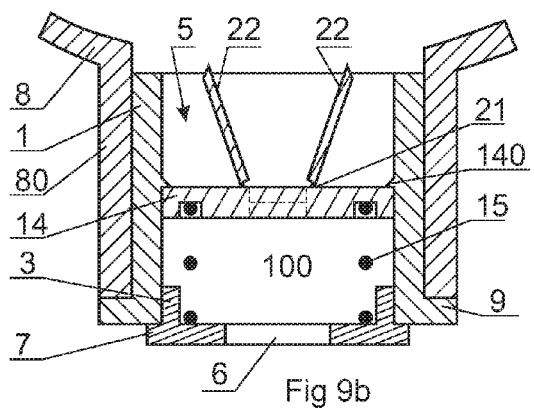
FIG. 9b is an axial cross-section of the embodiment of the invention illustrated to the FIG. 9a and seen in a stable initial state, the valve being represented in its rest position, and the chamber being represented with its maximum volume.
Figure 9D:
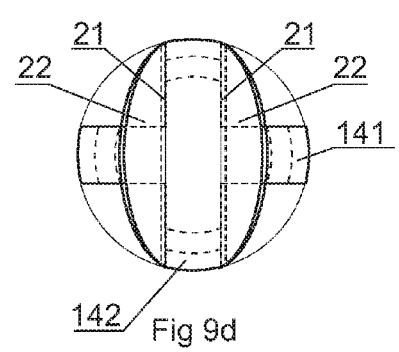
FIG. 9d is a top view of the piston and of the valve of the embodiment of the invention illustrated in FIGS. 9a to 9c, the piston and the valve being represented in two of the positions they occupy in FIG. 9c.
Figure 10A:
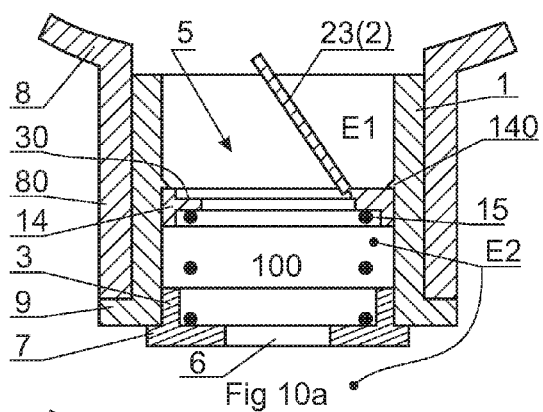
FIG. 10a is an axial cross-sectional view representing an embodiment of the invention in which the valve is formed by a single shutter illustrated in its rest position, and in which the chamber is closed by this shutter associated with a piston, this chamber having a variable volume and being represented with its maximum volume.
Figure 10B:
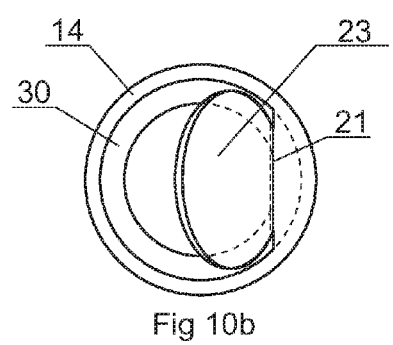
Figure 10C:
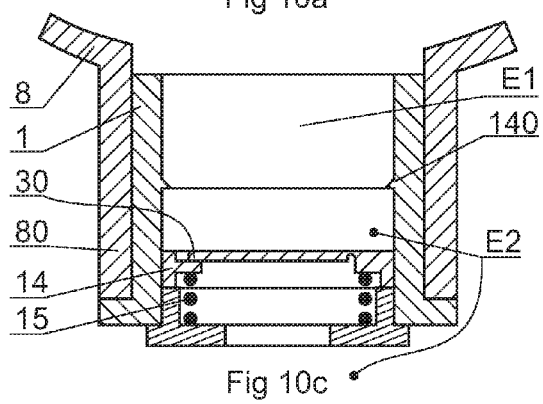
FIG. 10c is an axial cross-sectional view of the embodiment of the invention illustrated in FIGS. 10a and 10b, the valve being represented in its end position, and the chamber being represented with its minimal volume.
Figure 10D:
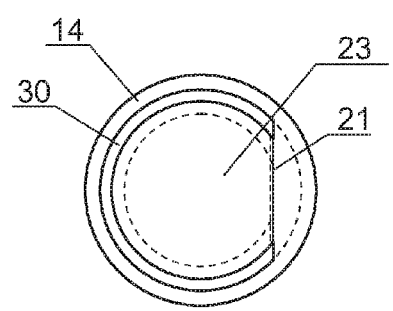
FIG. 10d is a top view of the piston and the valve of the embodiment of the invention illustrated in FIGS. 10a to 10c, the piston and the valve being represented in the position they occupy in FIG. 10c.

In the embodiment depicted in FIGS. 9a to 9d, the piston 14 substantially includes two mutually transverse beams 141 and 142, which can be particularly seen on FIG. 9d, and valve 2 is made up of two shutters 22 articulated on beam 142 by means of respective hinge-forming elastic tabs 21, these shutters 22 being symmetrical from one another with respect to the median plane of the beam 142 and the cylindrical hollow body 1.

In an embodiment, piston 14, each one of shutters 22 forming valve 2, and each one of the elastic hinge forming tabs 21 are integrally made from an elastic material.

The embodiment depicted in FIGS. 9a to 9d differs from all the other presented embodiments by the fact that valve 2, in its end position as represented on FIG. 9a, isolates upstream space E1 and downstream space E2 from each other not by being fixedly pressed on a sealing seat, but by a slipping bearing of the edge of each shutter 22 on the internal cylindrical wall of hollow body 1.

In the embodiment depicted in FIGS. 10a to 10d, valve 2 is made from a single shutter 23, articulated on piston 14 by a single elastic tab 21.

Meanwhile, the embodiment depicted in FIGS. 10a to 10d substantially differs from the embodiment depicted in FIGS. 8a to 8f by the fact that valve 2 is composed of a shutter 23 rotatably movable and not of a diaphragm movable in translation.

In an embodiment, the piston 14, the shutter 23 forming the valve 2, and the elastic hinge-forming tab 21 are integrally made from an elastic material.

As in the embodiment depicted in FIGS. 8a to 8f, the piston 14 of the embodiment depicted in FIGS. 10a to 10d has a substantially annular form defining a sealing seat 30 around a fluid passage which constitutes the inlet 5 of the chamber 100 and which allows a selective communication between upstream space E1 and downstream space E2.

The invention claimed is:

1. A metering device securable to a container adapted to contain a fluid for transferring, from an upstream space towards a downstream space, a predetermined volume of the fluid in response to a rise in pressure of the fluid in the upstream space, the device comprising:

at least a hollow body, a buoyant valve, and a sealing seat defined over a hollow or substantially annular member and surrounding a fluid passage disposed between an upstream space and a downstream space, the hollow body delimiting at least partially a chamber provided with an inlet and an outlet, the buoyant valve being movable with respect to the hollow body between a rest position, towards which the buoyant valve is biased by a return force, at least partially comprising buoyancy, and an end position, which is spaced from the rest position and towards which the valve is dragged by the fluid flowing from the upstream space towards the downstream space due to the rise in pressure, and in which the valve rests on the sealing seat, the upstream space extending at least outside the chamber on its inlet side, the downstream space extending at least outside the metering device and the chamber on an outlet side, the valve isolating one from the other the upstream space and the downstream space in the end position and only in the end position, and the outlet of the chamber communicating with the upstream space for any position of the valve other than its end position, wherein, once the rise in pressure is released, air enters the container via the outlet of the chamber.

2. The metering device of claim 1, wherein the hollow body is adapted to be substantially sealingly securable to a neck of the container.

3. The metering device of claim 2, wherein the container delimits a variable volume upstream space, the rise in pressure of the fluid being obtained by reducing the volume of the upstream space.

4. The metering device of claim 1 or 2, further comprising a spring biasing the buoyant valve towards the rest position.

5. The metering device of claim 4, wherein the spring is preloaded in compression.

6. The metering device of claim 4, wherein the spring is chosen so that an elastic force exerted on the buoyant valve by the spring substantially compensates a weight of the buoyant valve.

7. The metering device of claim 1, wherein the buoyant valve comprises a truncated head cylindrical floater.

8. The metering device of claim 1, wherein the buoyant valve comprises a spherical floater.

9. The metering device of claim 1, wherein the outlet of the chamber is bored in an elastically deformable wall and has a flow cross-sectional area reversibly openable under an effect of the rise in pressure of the fluid.

10. The metering device of claim 1, wherein the container is flexible and the rise in pressure is caused by a pressure exerted on the container.

11. The metering device of claim 1, wherein the container comprises substantially rigid walls, a piston being used for providing the rise in pressure of the fluid.

12. The metering device of claim 1, wherein the buoyant valve is hollow.

13. The metering device of claim 1, wherein a neck of the container is oriented downwardly during the rise in pressure of the fluid in the upstream space.

* * * * *